(12) United States Patent
Yang et al.

(10) Patent No.: US 11,014,732 B2
(45) Date of Patent: May 25, 2021

(54) VACUUM STORAGE BAG ASSEMBLY AND VACUUM STORAGE SYSTEM THEREWITH

(71) Applicant: Universal Trim Supply Co., Ltd., New Taipei (TW)

(72) Inventors: Shih-Sheng Yang, Taipei (TW); Franscena Schandelmayer-Davis, Blackstone, MA (US)

(73) Assignee: Universal Trim Supply Co., Ltd., New Taipei (TW)

( * ) Notice: Subject to any disclaimer, the term of this patent is extended or adjusted under 35 U.S.C. 154(b) by 166 days.

(21) Appl. No.: 16/447,988

(22) Filed: Jun. 21, 2019

(65) Prior Publication Data

US 2020/0399042 A1 Dec. 24, 2020

(51) Int. Cl.
*B65D 81/20* (2006.01)
*F16K 15/14* (2006.01)
*B65D 77/22* (2006.01)
*F16K 15/18* (2006.01)
*B65D 33/25* (2006.01)
*B65B 31/04* (2006.01)

(52) U.S. Cl.
CPC ........ *B65D 81/2023* (2013.01); *B65B 31/047* (2013.01); *B65D 33/2541* (2013.01); *B65D 77/225* (2013.01); *B65D 81/2038* (2013.01); *F16K 15/141* (2013.01); *F16K 15/18* (2013.01); *F16K 15/14* (2013.01); *F16K 15/144* (2013.01); *F16K 15/185* (2013.01)

(58) Field of Classification Search
CPC ............ B65D 81/2038; B65D 81/2023; B65B 31/047; B65B 31/04; F16K 15/144

USPC .................................................. 137/549–550
See application file for complete search history.

(56) References Cited

U.S. PATENT DOCUMENTS

| | | | | |
|---|---|---|---|---|
| 5,111,838 A | * | 5/1992 | Langston ................ | B60P 7/065 137/223 |
| 5,339,959 A | * | 8/1994 | Cornwell ............... | B65D 33/01 206/438 |
| 6,408,872 B1 | * | 6/2002 | Skeens ............... | B65D 33/1666 137/512.15 |
| 6,607,634 B2 | * | 8/2003 | Ye ......................... | H01J 37/321 156/345.48 |
| 8,066,433 B2 | * | 11/2011 | Sabounjian ........ | B65D 33/2541 383/103 |
| 10,683,115 B2 | * | 6/2020 | Chang ................... | F04D 17/168 |
| 2004/0257035 A1 | * | 12/2004 | Chang ..................... | F21L 4/005 320/107 |

(Continued)

*Primary Examiner* — Timothy P. Kelly
(74) *Attorney, Agent, or Firm* — Winston Hsu

(57) ABSTRACT

A vacuum storage bag assembly includes a zipper bag and a vacuum valve. An opening is formed on the zipper bag. The vacuum valve is connected to the zipper bag. The vacuum valve includes a valve seat, a filtrating component and a check valve. The valve seat is disposed on the zipper bag. The valve seat includes a connecting port and a communication channel communicated with the connecting port and with interior of the zipper bag via the opening, and the connecting port is configured to be connected to a vacuum source. The filtrating component is disposed on an upstream portion of the communication channel. The check valve is disposed on a downstream portion of the communication channel and allows fluid to flow from the interior of the zipper bag, through the filtrating component, and to flow out of the connecting port.

20 Claims, 14 Drawing Sheets

(56) References Cited

U.S. PATENT DOCUMENTS

2006/0201576 A1* 9/2006 Domenig .............. B65B 31/047
　　　　　　　　　　　　　　　　　　　141/65
2008/0044113 A1* 2/2008 Tilman ............... B65D 33/2591
　　　　　　　　　　　　　　　　　　　383/103

* cited by examiner

VACUUM STORAGE BAG ASSEMBLY AND VACUUM STORAGE SYSTEM THEREWITH

BACKGROUND OF THE INVENTION

1. Field of the Invention

The present invention relates to a vacuum storage product, and more particularly, to a vacuum storage bag assembly and a vacuum storage system therewith.

2. Description of the Prior Art

With advancement of technology and development of economy, there are more and more consumer goods available in the market. For example, a conventional vacuum storage system usually includes a zipper bag and a vacuum source. The zipper bag can accommodate food or clothing. The vacuum source can discharge the fluid, such as air, inside the zipper bag to extend storage time and reduce storage volume. However, the vacuum source of the conventional vacuum storage system is provided with a power cord connector and powered by a wall socket, which reduces portability of the vacuum source.

Furthermore, there is another conventional vacuum storage system including a zipper bag, a vacuum source and a check valve. The check valve can prevent external fluid from entering the zipper bag. However, fluid inside the zipper bag may contain particles, dust, debris or moisture. During discharge of the fluid inside the zipper bag, such content may cause damage of the check valve or even the vacuum source.

SUMMARY OF THE INVENTION

Therefore, it is an objective of the present invention to provide a vacuum storage bag assembly and a vacuum storage system therewith for solving the aforementioned problem.

In order to achieve the aforementioned objective, the present invention discloses a vacuum storage bag assembly which includes a zipper bag and a vacuum valve. An opening is formed on the zipper bag. The vacuum valve is connected to the zipper bag. The vacuum valve includes a valve seat, a filtrating component and a check valve. The valve seat is disposed on the zipper bag. The valve seat includes a connecting port and a communication channel communicated with the connecting port and with interior of the zipper bag via the opening. The connecting port is configured to be connected to a vacuum source. The filtrating component is disposed on an upstream portion of the communication channel. The check valve is disposed on a downstream portion of the communication channel and allows fluid in the interior of the zipper bag to flow from the interior of the zipper bag, through the filtrating component, and to flow out of the connecting port.

According to an embodiment of the present invention, the valve seat includes an upper seat portion and a lower seat portion combined with each other. The upper seat portion is disposed on an outer side of the zipper bag, and the lower seat portion is disposed on an inner side of the zipper bag.

According to an embodiment of the present invention, the check valve is disposed on the upper seat portion, and the filtrating component is disposed on the lower seat portion.

According to an embodiment of the present invention, the check valve is disposed through the opening, and the filtrating component is disposed away from the opening horizontally.

According to an embodiment of the present invention, the valve seat is disposed on an outer side of the zipper bag. The check valve is disposed on the valve seat, and the filtrating component is disposed and abutted between the valve seat and the zipper bag.

According to an embodiment of the present invention, a recess is formed on the zipper bag. The opening is covered by the filtrating component, and the check valve is at least partially accommodated in the recess and away from the opening horizontally.

According to an embodiment of the present invention, the filtrating component and the check valve are not aligned with each other along a vertical direction.

According to an embodiment of the present invention, the filtrating component and the check valve are aligned with each other along a vertical direction.

According to an embodiment of the present invention, the filtrating component is configured to filter dust, debris, or moisture from the fluid flowing from the interior of the zipper bag.

According to an embodiment of the present invention, the vacuum storage bag assembly further includes a cap assembly configured to cover the connecting port.

In order to achieve the aforementioned objective, the present invention further discloses a vacuum storage system including a vacuum storage bag assembly, a portable vacuum source and a portable power supply module. The vacuum storage bag assembly includes a zipper bag and a vacuum valve. An opening is formed on the zipper bag. The vacuum valve is connected to the zipper bag, and the vacuum valve includes a valve seat, a filtrating component and a check valve. The valve seat is disposed on the zipper bag. The valve seat includes a connecting port and a communication channel communicated with the connecting port and with interior of the zipper bag via the opening. The filtrating component is disposed on an upstream portion of the communication channel. The check valve is disposed on a downstream portion of the communication channel, for allowing fluid in the interior of the zipper bag to flow from the interior of the zipper bag, through the filtrating component, and to flow out of the connecting port. The portable vacuum source is configured to connect to the connecting port directly or indirectly and to provide a vacuum suction for the vacuum valve to discharge the fluid through the connecting port. The portable power supply module is configured to connect to the portable vacuum source and to provide electricity to the portable vacuum source.

According to an embodiment of the present invention, the portable power supply module is a mobile phone.

According to an embodiment of the present invention, the portable vacuum source includes an interlocking mating port configured to be connected to the connecting port. The connecting port includes a connecting port body and a first mating port protrusion. The interlocking mating port includes an interlocking mating port body and a second mating port protrusion. When the interlocking mating port body is inserted into the connecting port body along an inserting direction and then rotated relative to the connecting port body by a predetermined degree along a rotating direction perpendicular to the inserting direction, the second mating port protrusion is moved to engage with the first mating port protrusion, so that the interlocking mating port body is prevented from departing away from the connecting port body along a departing direction opposite to the inserting direction. The interlocking mating port body is located at the connecting position relative to the connecting port body when the second mating port protrusion is moved to engage with the first mating port protrusion.

According to an embodiment of the present invention, the interlocking mating port further includes a mating sealing component disposed on a side of the interlocking mating port body adjacent to the connecting port body. The connecting port further includes a sealing protrusion protruding from a side of the connecting port body toward the mating sealing component. The mating sealing component is compressed by the sealing protrusion when the interlocking mating port body is located at the connecting position relative to the connecting port body.

According to an embodiment of the present invention, the vacuum storage system further includes an extended receiving cup assembly. The extending receiving cup assembly includes a main receiving cup, at least one extended receiving cup and a receiving cup cover. The main receiving cup is configured to connect to the connecting port. The receiving cup cover is configured to connect to the portable vacuum source. The at least one extended receiving cup is configured to be detachable installed between the main receiving cup and the receiving cup cover.

In summary, the present invention utilizes the filtrating component disposed on the upstream portion of the communication channel to filter dust, debris, or moisture from the fluid flowing from the interior of the zipper bag. Therefore, the present invention can not only extend storage time and reduce storage volume but also prevent damage of the check valve or the portable vacuum source caused by the aforementioned content. Furthermore, the portable vacuum source can be powered by the mobile phone instead of a wall socket, and there is no battery equipped for the portable vacuum source, which makes the portable vacuum source safer and more lightweight and portable. In addition, the filtrating component and the check valve can be disposed away from each other horizontally, so as to reduce a thickness of the entire vacuum storage bag assembly. Furthermore, the filtrating component can be disposed on the lower seat portion disposed on the inner side of the zipper bag, so as to facilitate replacement of the filtrating component.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
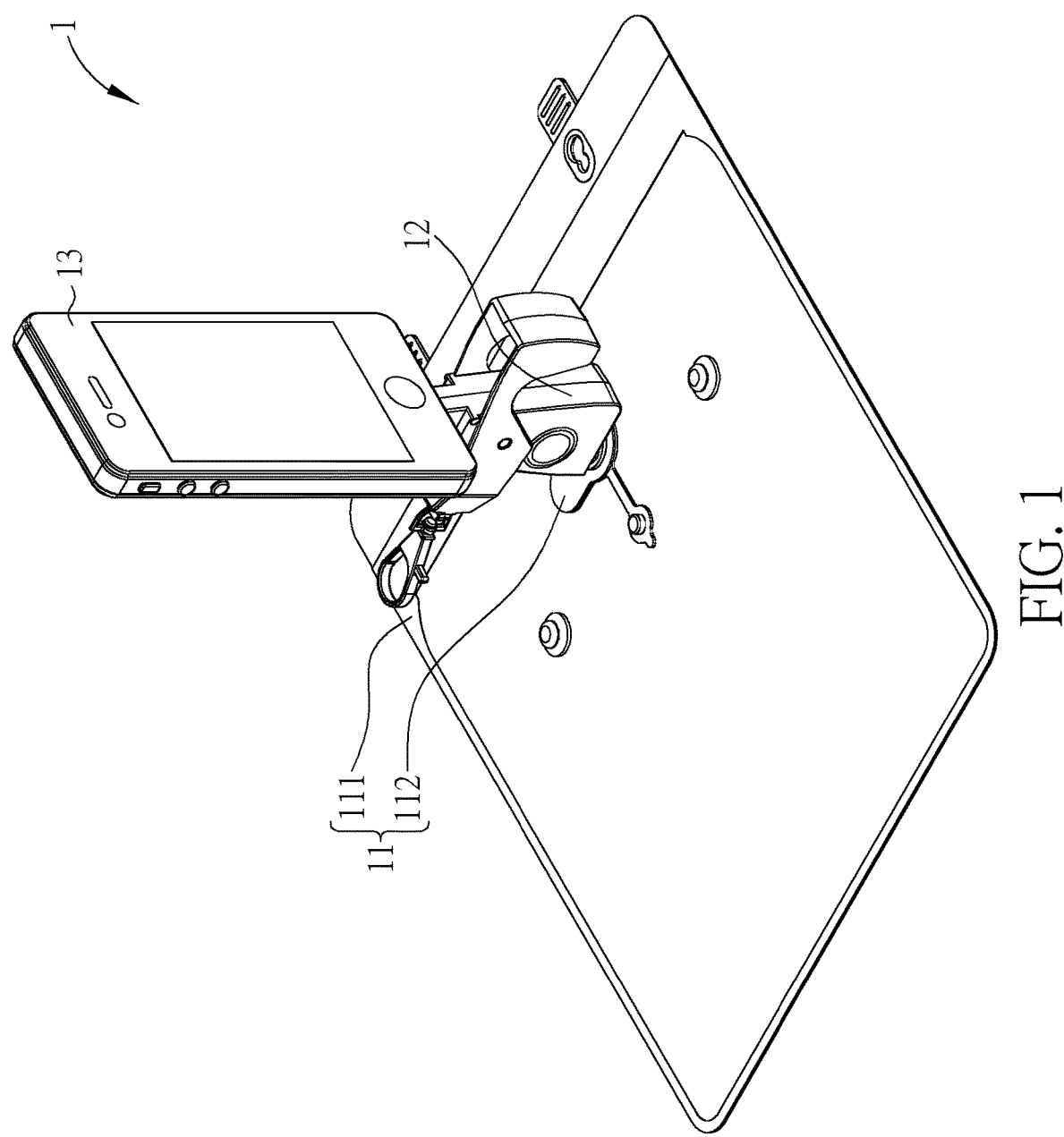
FIG. 1 is a schematic diagram of a vacuum storage system according to a first embodiment of the present invention.
Figure 2:
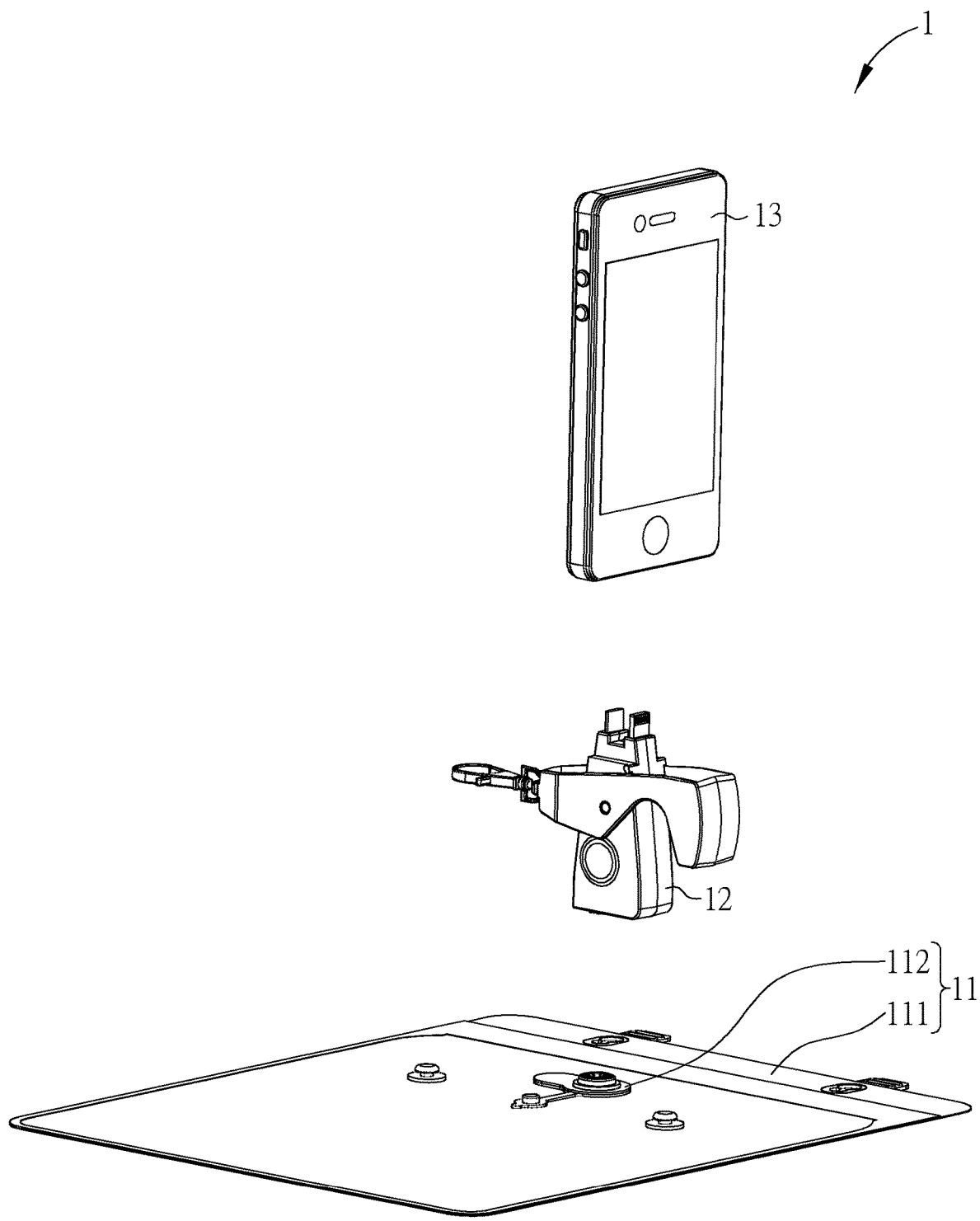
FIG. 2 is an exploded diagram of the vacuum storage system according to the first embodiment of the present invention.
Figure 3:
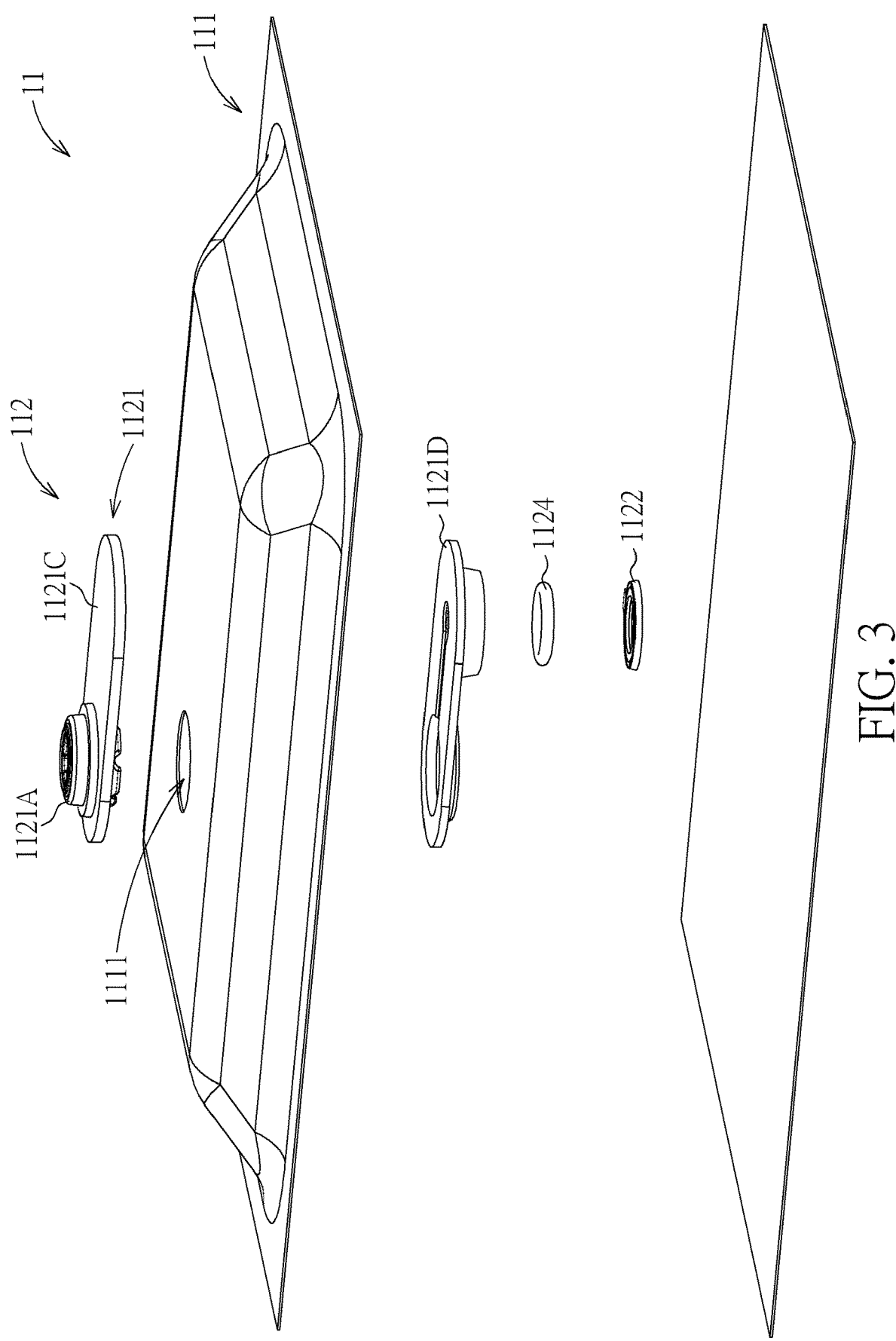
FIG. 3 is a partial exploded diagram of a vacuum storage bag assembly according to the first embodiment of the present invention.
Figure 4:
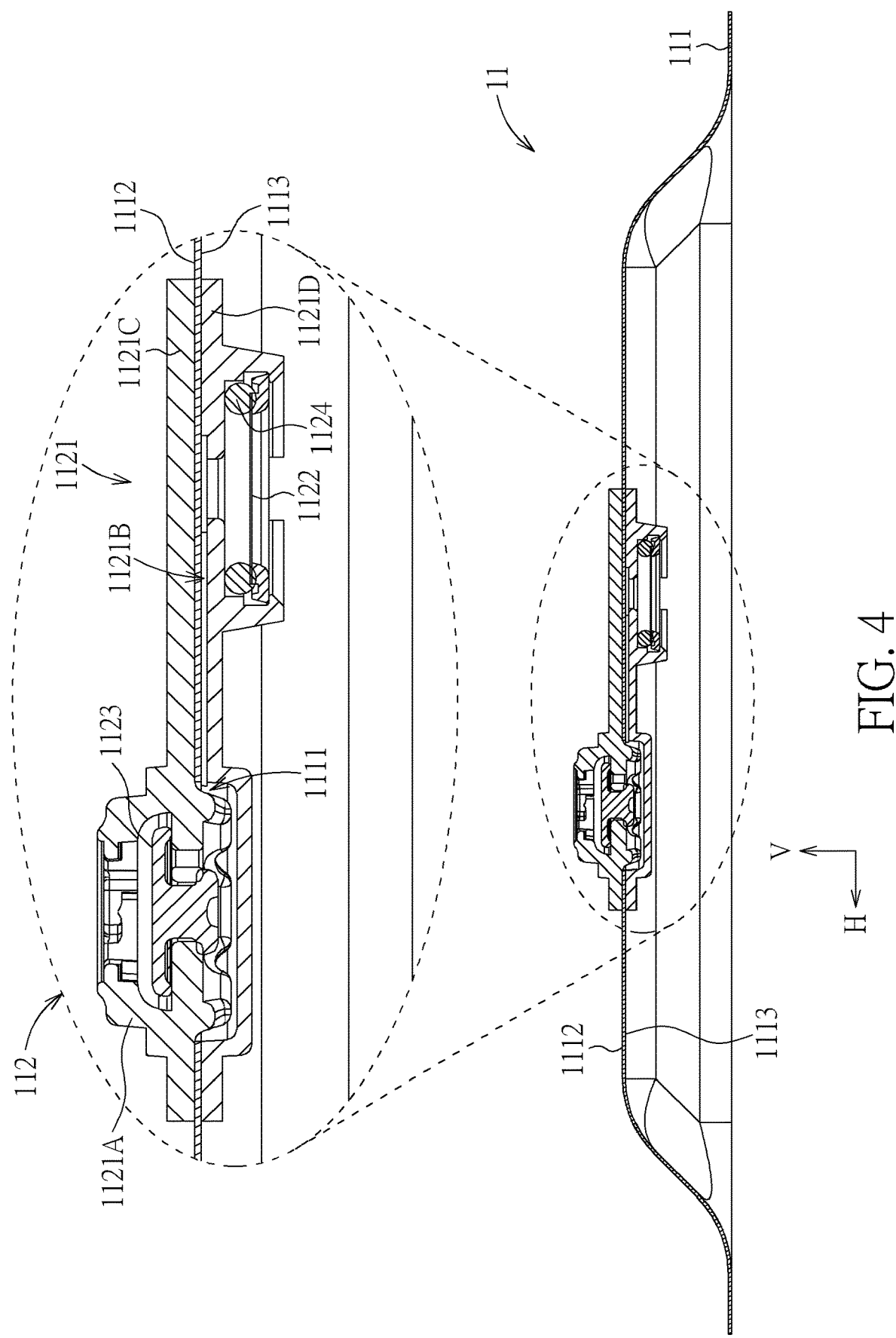
FIG. 4 is a partial sectional diagram of the vacuum storage bag assembly according to the first embodiment of the present invention.

Please refer to FIG. 1 to FIG. 4. FIG. 1 is a schematic diagram of a vacuum storage system 1 according to a first embodiment of the present invention. FIG. 2 is an exploded diagram of the vacuum storage system 1 according to the first embodiment of the present invention. FIG. 3 is a partial exploded diagram of a vacuum storage bag assembly 11 according to the first embodiment of the present invention. FIG. 4 is a partial sectional diagram of the vacuum storage bag assembly 11 according to the first embodiment of the present invention. As shown in FIG. 1 to FIG. 4, the vacuum storage system 1 includes the vacuum storage bag assembly 11, a portable vacuum source 12 and a portable power supply module 13. The vacuum storage bag assembly 11 can be configured to accommodate food, clothing and etc. The portable vacuum source 12 is configured to connect to the vacuum storage bag assembly 11 for discharging fluid, such as air, inside the vacuum storage bag assembly 11. The portable power supply module 13 is configured to connect to the portable vacuum source 12 for providing electricity to the portable vacuum source 12. Preferably, in this embodiment, there is not a need for an auxiliary battery for the portable vacuum source 12, and the portable power supply module 13 can be a mobile phone, which makes the portable vacuum source 12 safer, lightweight, and portable.

The vacuum storage bag assembly 11 includes a zipper bag 111 and a vacuum valve 112. An opening 1111 is formed on the zipper bag 111. The vacuum valve 112 is connected to the zipper bag 111, and the vacuum valve 112 includes a valve seat 1121, a filtrating component 1122 and a check valve 1123. The valve seat 1121 is disposed on the zipper bag 111. The valve seat 1121 includes a connecting port 1121A and a communication channel 1121B. The connecting port 1121A is configured to connect with the portable vacuum source 12. The communication channel 1121B is communicated with the connecting port 1121A and interior of the zipper bag 111 via the opening 1111. The filtrating component 1122 is disposed on an upstream portion of the communication channel 1121B and configured to filter dust, debris, or moisture from fluid flowing from the interior of the zipper bag 111. The check valve 1123 is disposed on a downstream portion of the communication channel 1121B and allows the fluid to flow from the interior of the zipper bag 111, through the filtrating component 1122, and to flow out of the connecting port 1121A.

The zipper bag 111 can include a bag body and a zip lock. The bag body can be formed by two flat film layers combined with each other. The zip lock can be disposed on a top opening of the bag body. The bag body can be made of plastic material, such as polypropylene (PP), polyethylene (PE), polyvinylchloride, or Thermoplastic polyurethanes (TPU), or silicon. Furthermore, the zip lock can be a slider or a zip fastener. However, the present invention is not limited to thereto. For example, in another embodiment, the zip lock can be disposed all around a periphery of the bag body. The structure and the configuration of the zipper bag depend on practical demands.

Specifically, the valve seat 1121 includes an upper seat portion 1121C and a lower seat portion 1121D combined with the upper seat portion 1121C. The upper seat portion 1121C is disposed on an outer side 1112 of the zipper bag 111, and the lower seat portion 1121D is disposed on an inner side 1113 of the zipper bag 111. The check valve 1123 is disposed on the upper seat portion 1121C, and the filtrating component 1122 is disposed on the lower seat portion 1121D.

Preferably, in order to reduce a thickness of the entire vacuum storage bag assembly 11, the check valve 1123 can be disposed through the opening 1111, and the filtrating component 1122 can be disposed away from the opening 1111 horizontally. In other words, the filtrating component 1122 and the check valve 1123 can be misaligned with each other along a vertical direction V and separated from each other in a horizontal direction H perpendicular to the vertical direction V. In other words, in this embodiment, the check valve 1123 is partially located inside the zipper bag 111, and the filtrating component 1122 is located inside the zipper bag 111 and spaced from the check valve 1123 in a distance along the horizontal direction H. Such configuration can effectively reduce a thickness of the vacuum valve 112, so as to reduce the thickness of the entire vacuum storage bag assembly 11. However, the present invention is not limited to this embodiment. For example, in another embodiment, the filtrating component and the check valve can be aligned with each other along the vertical direction.

Preferably, in order to make the filtrating component 1122 replaceable, the vacuum valve 112 can further include a sealing component 1124, such as an O-ring, disposed between the filtrating component 1122 and the lower seat portion 1121D for fixing the filtrating component 1122, i.e., the filtrating component 1122 is detachably disposed on the lower seat portion 1121D by the sealing component 1124. When it is desired to remove the filtrating component 1122, it only has to pull the filtrating component 1122 out of the lower seat portion 1121D via an opening of the lower seat portion 1121D. On the other hand, when it is desired to install the filtrating component 1122, it only has to push the filtrating component 1122 into the lower seat portion 1121D via the opening of the lower seat portion 1121D, so that the filtrating component 1122 is disposed between the sealing component 1124 and the lower seat portion 1121D. However, the present invention is not limited to this embodiment. For example, in another embodiment, the filtrating component also can be fixed with the lower seat portion.

Furthermore, in this embodiment, the upper seat portion can be fixedly combined with the lower seat portion. However, the present invention is not limited to this embodiment. For example, in another embodiment, the upper seat portion and the lower seat portion also can be detachably combined with each other for easy maintenance of the vacuum valve, e.g., replacement of the check valve.

Figure 5:
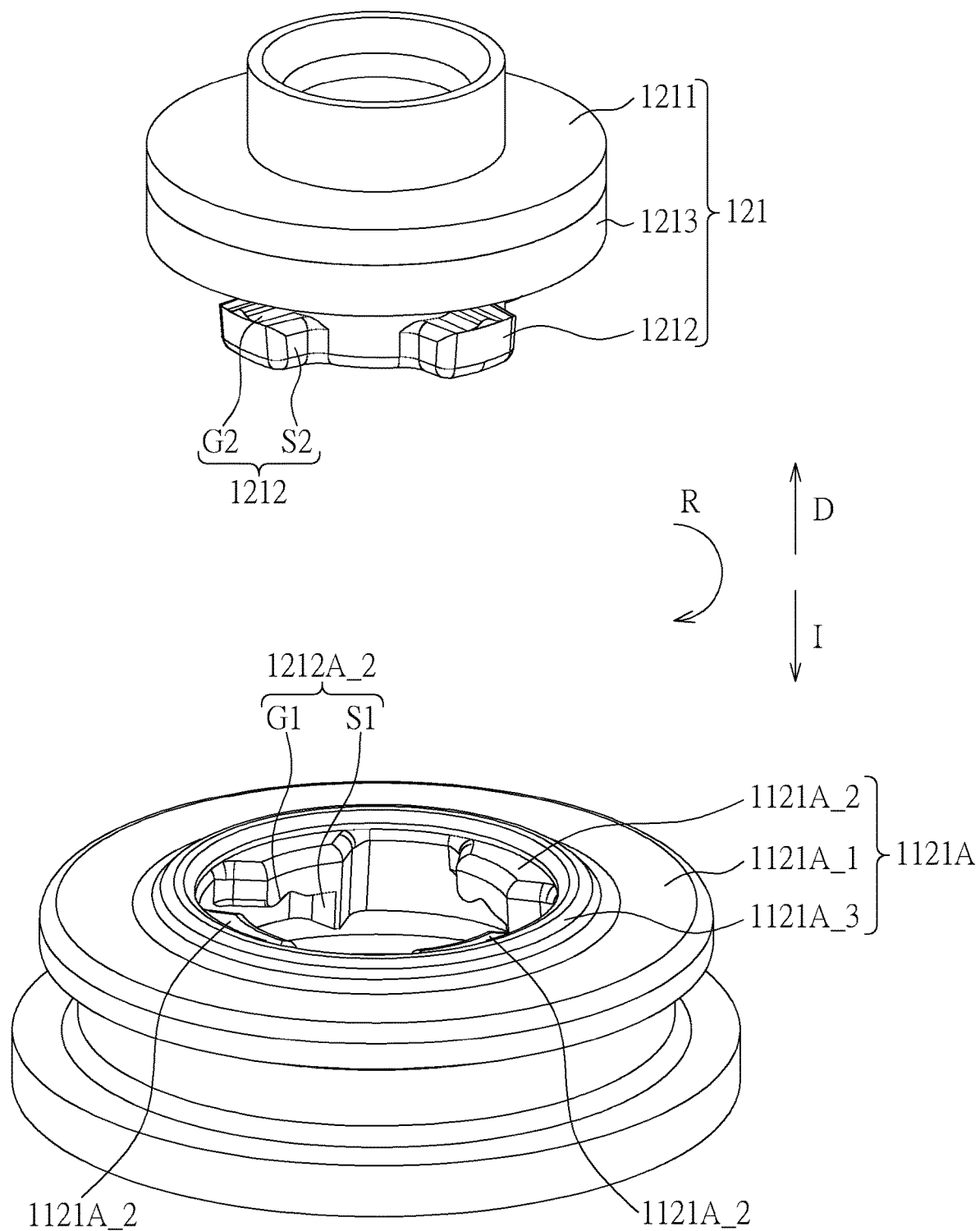
FIG. 5 is a diagram of a connecting port and an interlocking mating port of a portable vacuum source according to the first embodiment of the present invention.
Figure 6:
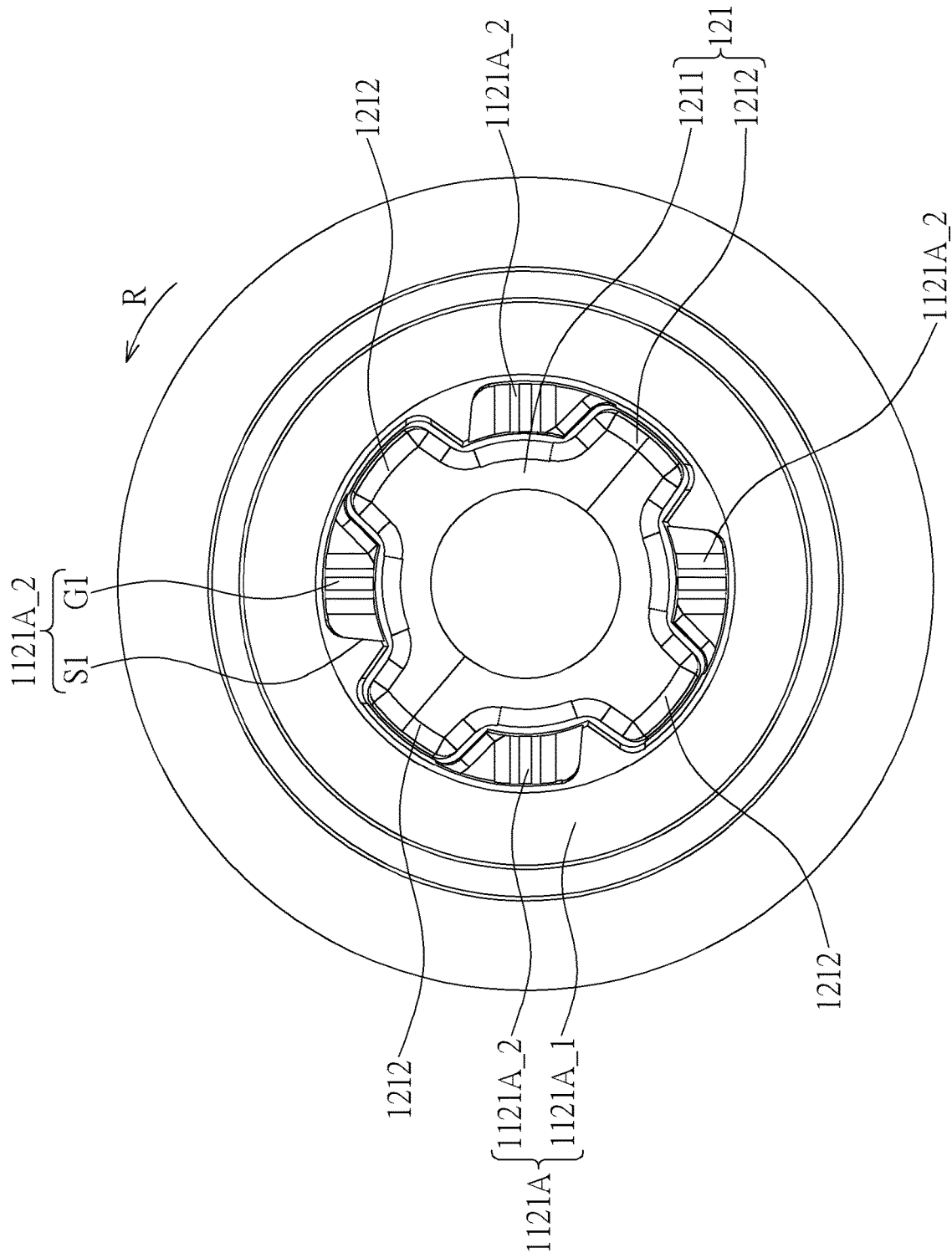
FIG. 6 and FIG. 7 are diagrams of the interlocking mating port located at different positions relative to the connecting port according to the first embodiment of the present invention.
Figure 7:
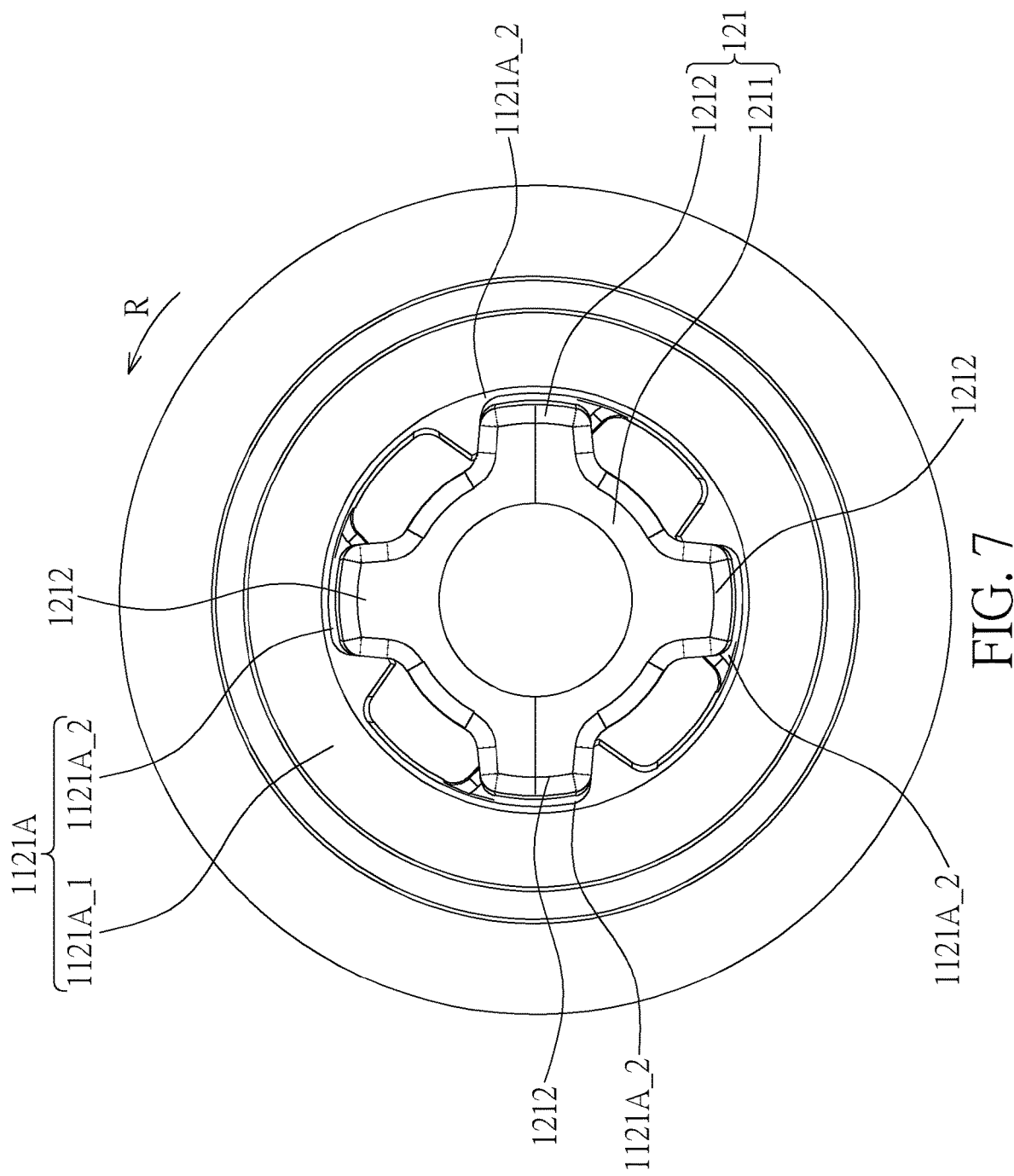
Figure 8:
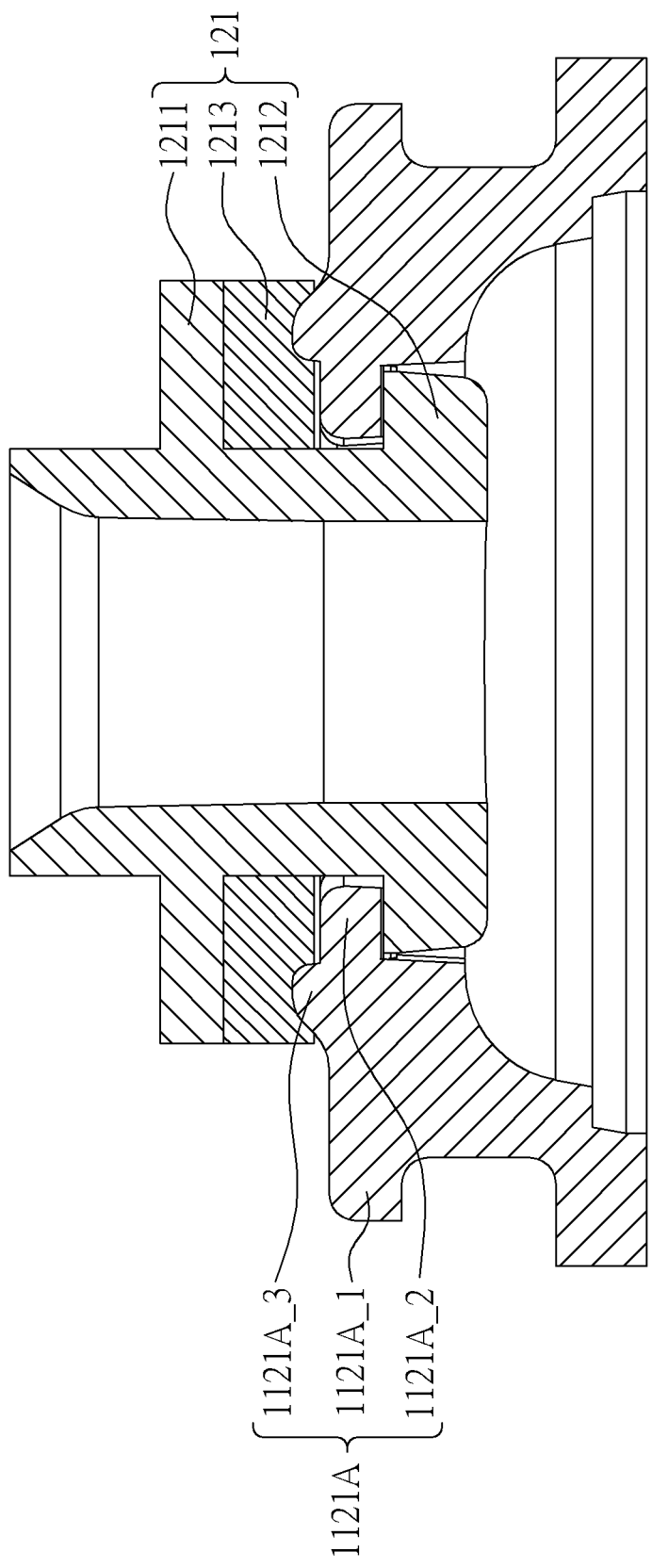
FIG. 8 is a sectional diagram of the interlocking mating port located at a connecting position relative to the connecting port according to the first embodiment of the present invention.

Please refer to FIG. 5 to FIG. 8. FIG. 5 is a diagram of the connecting port 1121A and an interlocking mating port 121 of the portable vacuum source 12 according to the first embodiment of the present invention. FIG. 6 and FIG. 7 are diagrams of the interlocking mating port 121 located at different positions relative to the connecting port 1121A according to the first embodiment of the present invention. FIG. 8 is a sectional diagram of the interlocking mating port 121 located at a connecting position relative to the connecting port 1121A according to the first embodiment of the present invention. As shown FIG. 5 to FIG. 8, the portable vacuum source 12 includes the interlocking mating port 121 configured to be connected to the connecting port 1121A. The interlocking mating port 121 includes an interlocking mating port body 1211 and four second mating port protrusions 1212 protruding from the interlocking mating port body 1211 outwardly. The connecting port 1121A includes a connecting port body 1121A_1, and four first mating port protrusions 1121A_2 protruding from the connecting port body 1121A_1 inwardly. When it is desired to connect the interlocking mating port 121 to the connecting port 1121A, the interlocking mating port body 1211 can be inserted into the connecting port body 1121A_1 along an inserting direction I, and then rotated relative to the connecting port body 1121A_1 by a predetermined degree along a rotating direction R perpendicular to the inserting direction I, so that the four second mating port protrusions 1212 are moved to engage with the four first mating port protrusions 1121A_2 for preventing the interlocking mating port body 1211 from departing away from the connecting port body 1121A_1 along a departing direction D opposite to the inserting direction I. When the four second mating port protrusions 1212 are moved to engage with the four first mating port protrusions 1121A_2, the interlocking mating port body 1211 is located at the connecting position relative to the connecting port body 1121A_1, which secures the connection of the vacuum valve 1121 and the portable vacuum source 12.

The interlocking mating port 121 further includes a mating sealing component 1213 disposed on a side of the interlocking mating port body 1211 adjacent to the connecting port body 1121A_1. The connecting port 1121A further includes a sealing protrusion 1121A_3 protruding from a side of the connecting port body 1121A_1 toward the mating sealing component 1213. The mating sealing component 1213 is compressed by the sealing protrusion 1121A_3 when the interlocking mating port body 1211 is located at the connecting position relative to the connecting port body 1121A_1, which prevents leakage of the fluid at the connection of the connecting port 1121A of the vacuum valve 1121 and the interlocking mating port 121 of the portable vacuum source 12.

Preferably, in this embodiment, each first mating port protrusion 1121A_2 includes a first stopping portion S1 and a first abutting portion G1, and each second mating port protrusion 1212 includes a second stopping portion S1 and a second abutting portion G2. When the interlocking mating port body 1211 is rotated relative to the connecting port body 1121A_1 along the rotating direction R to the connecting position, the first stopping portion S1 abut against the second stopping portion S2 for stopping the interlocking mating port body 1211 from rotating relative to the connecting port body 1121A_1, so as to position the interlocking mating port body 1211 at the connecting position relative to the connecting port body 1121A_1. Furthermore, during the rotation of the interlocking mating port body 1211 relative to the connecting port body 1121A_1 along the rotating direction R to the connecting position, the first abutting portion G1 cooperates with the second abutting portion G2, so as to keep the mating sealing component 1213 being compressed by the sealing protrusion 1121A_3 firmly and prevent the interlocking mating port body 1211 from departing away from the connecting port body 1121A_1 along the departing direction D. However, the numbers and the structures of the first mating port protrusion and the second mating port protrusion are not limited to this embodiment. It depends on practical demands.

When it is desired to discharge the fluid inside the zipper bag 111, the zipper bag 111 can be closed, the connecting port 1121A can be connected to the interlocking mating port 121 of the portable vacuum source 12 firmly by engagement of the four first mating port protrusions 1121A_2 and the four second mating port protrusions 1212, and the portable vacuum source 12 can be connected to the portable power supply module 13, such as the mobile phone. During operation of the portable vacuum source 12, the portable vacuum source 12 can initiate the fluid inside the fluid inside the zipper bag 111 to flow from the interior of the zipper bag 111 through the filtrating component 1122 and the check valve 1123 along the communication channel 1121B and then flow out of the connecting port 1121A to the atmosphere. During aforementioned process, the dust, debris, or moisture contained in the fluid can be filtered by the filtrating component 1122, so that it prevents damage of the check valve 1123 or the portable vacuum source 12 caused by such content, which makes the vacuum storage system 1 more reliable.

Figure 9:
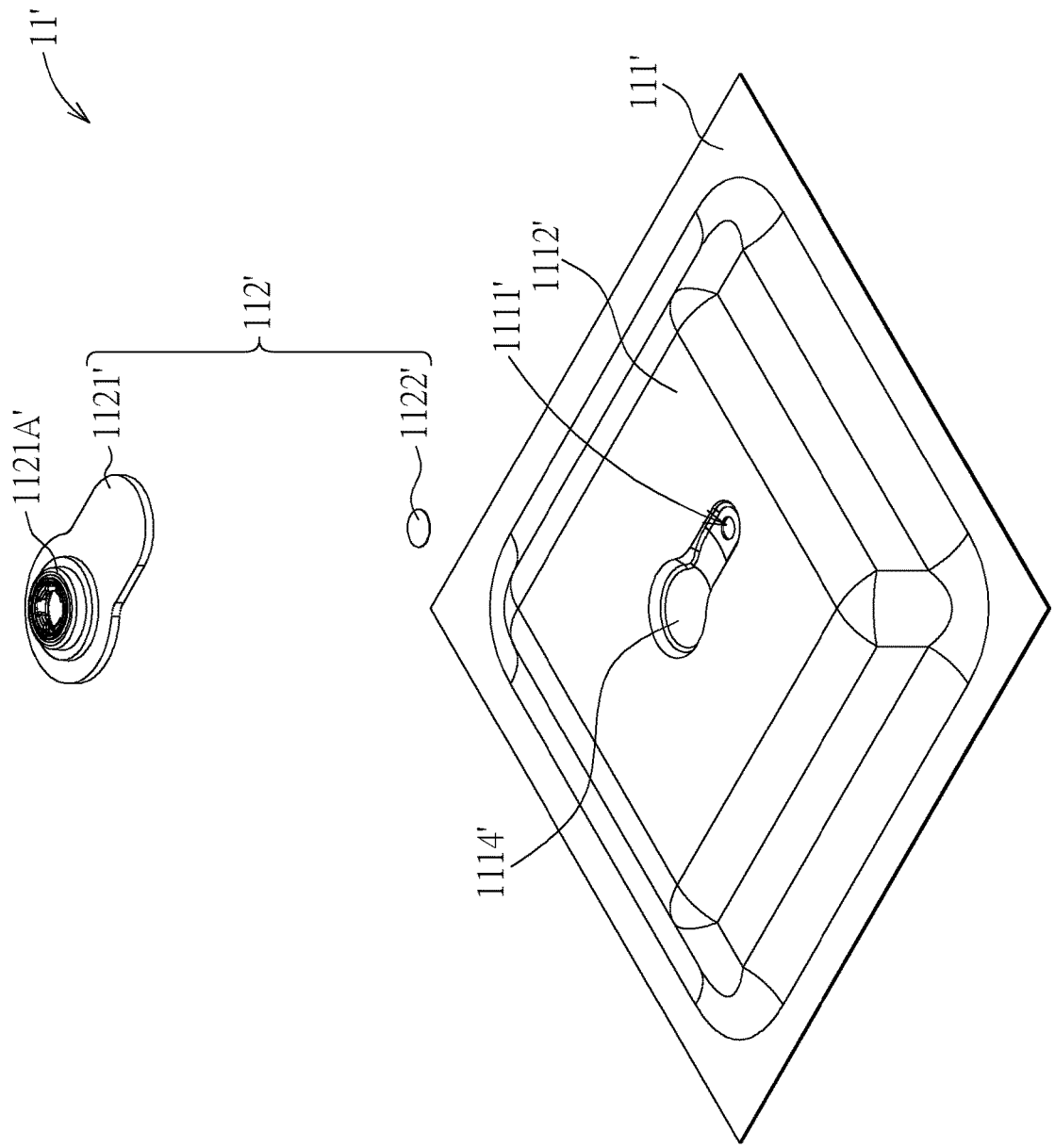
FIG. 9 is a partial exploded diagram of a vacuum storage bag assembly according to a second embodiment of the present invention.
Figure 10:
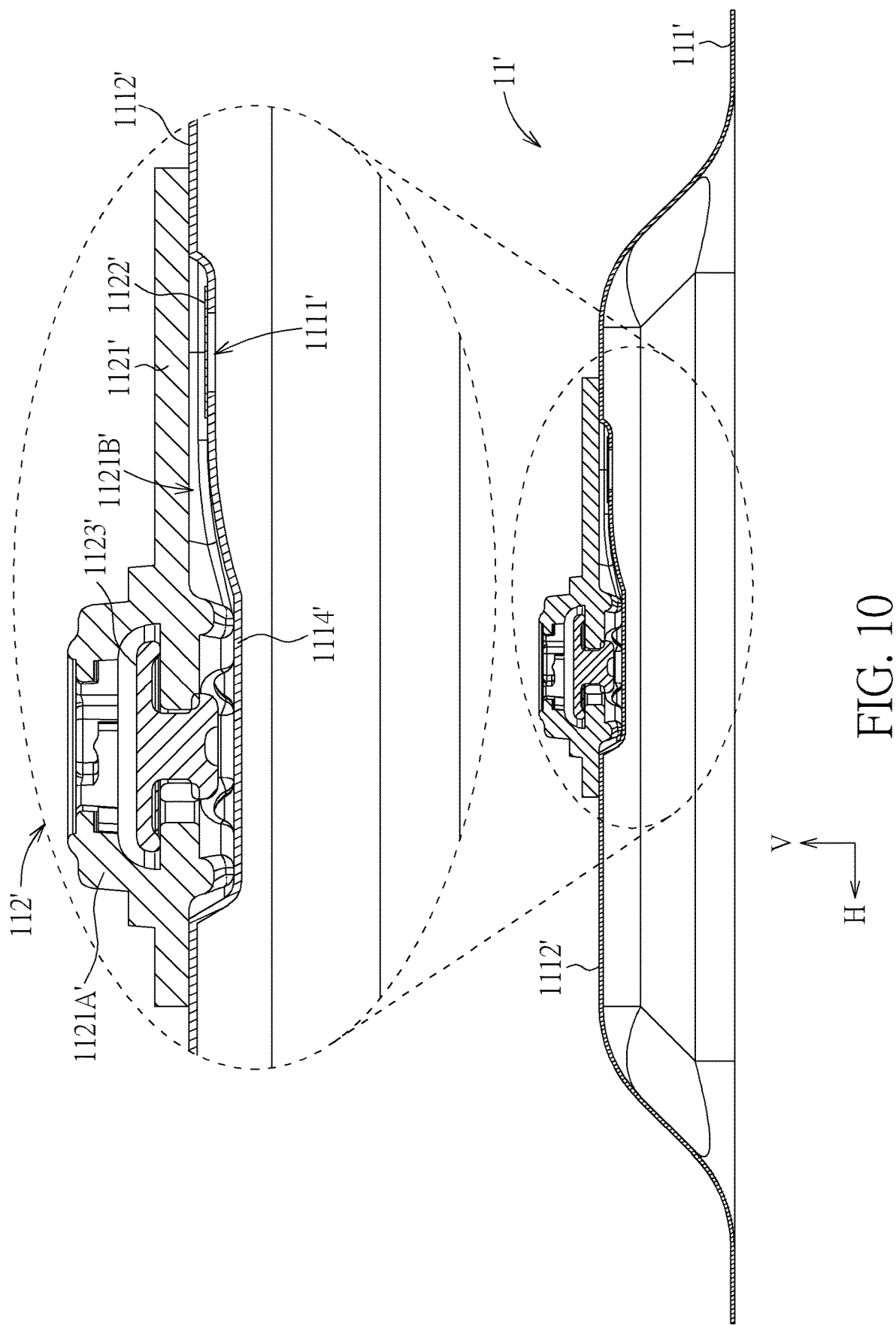
FIG. 10 is a partial sectional diagram of the vacuum storage bag assembly according to the second embodiment of the present invention.

Please refer to FIG. 9 and FIG. 10. FIG. 9 is a partial exploded diagram of a vacuum storage bag assembly 11' according to a second embodiment of the present invention. FIG. 10 is a partial sectional diagram of the vacuum storage bag assembly 11' according to the second embodiment of the present invention. As shown in FIG. 5 and FIG. 6, different from the vacuum storage bag assembly 11 of the first embodiment, the vacuum storage bag assembly 11' includes a zipper bag 111' and a vacuum valve 112'. An opening 1111' is formed on the zipper bag 111'. The vacuum valve 112' includes a valve seat 1121', a filtrating component 1122' and a check valve 1123'. The valve seat 1121' is disposed on an outer side 1112' of the zipper bag 111' and can be a one-piece structure which is different from the valve seat 1121 of the first embodiment. The valve seat 1121' includes a connecting port 1121A' and a communication channel 1121B' communicated with the opening 1111' and the connecting port 1121A'. The check valve 1123' is disposed on the valve seat 1121', and the filtrating component 1122' is disposed and abutted between the valve seat 1121' and the zipper bag 111'. In other words, the filtrating component 1122' of this embodiment is fixed between the valve seat 1121' and the zipper bag 111' and not replaceable.

Preferably, in order to reduce a thickness of the vacuum storage bag assembly 11', the recess 1114' is formed on the outer side 1112' of the zipper bag 111'. The opening 1111' is formed on a bottom side of the recess 1114' and covered by the filtrating component 1122'. The check valve 1123' is at least partially accommodated in the recess 1114' and away from the opening 1111' horizontally. In other words, in this embodiment, the check valve 1123' and the filtrating component 1122' are located outside the zipper bag 111' and spaced from each other in a distance along the horizontal direction H, and the check valve 1123' and the filtrating component 1122' are at least partially accommodated inside the recess 1114'. Such configuration can effectively reduce a thickness of the vacuum valve 112', so as to reduce the thickness of the entire vacuum storage bag assembly 11'. However, the present invention is not limited to this embodiment.

Figure 11:
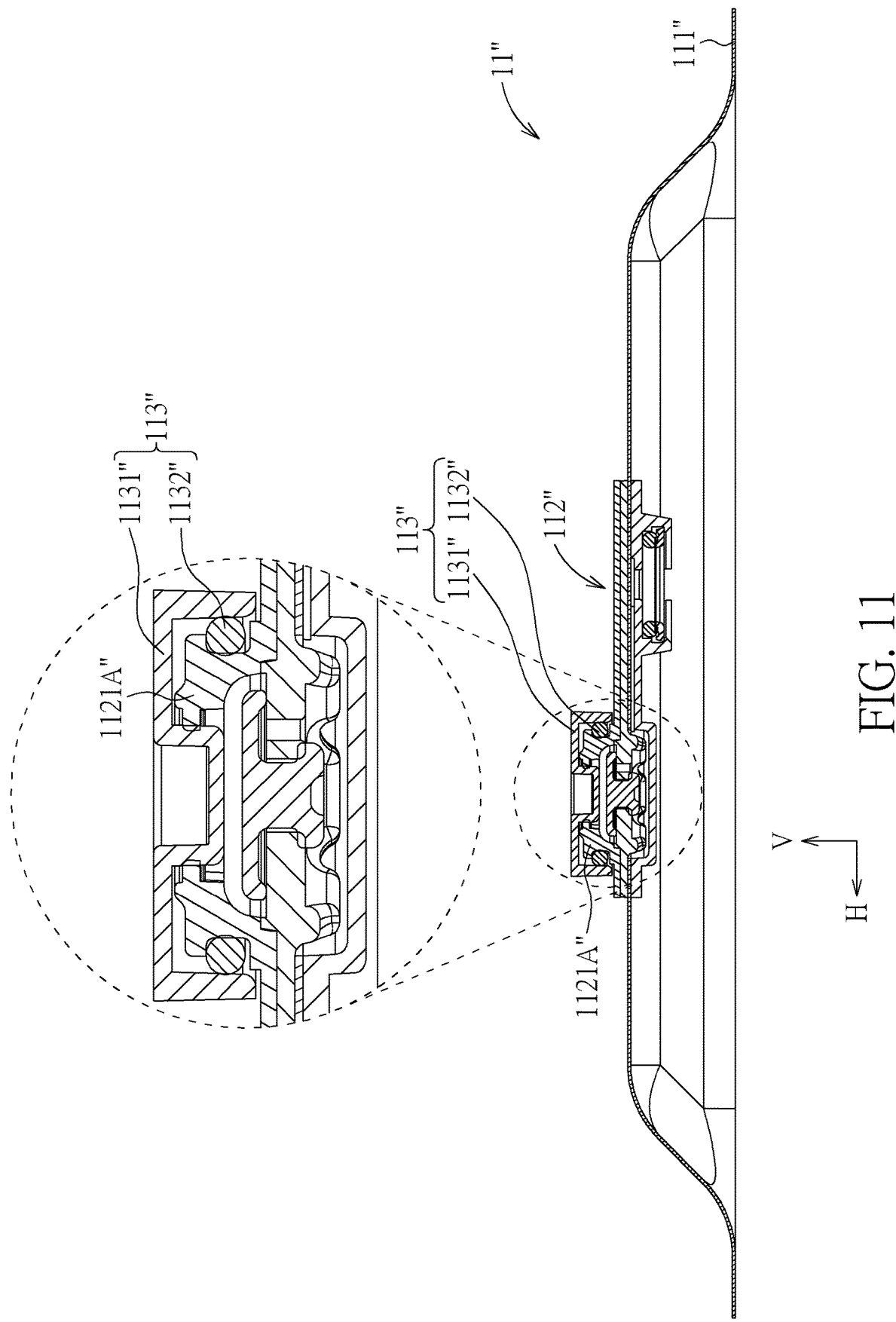
FIG. 11 is a partial diagram of a vacuum storage bag assembly according to a third embodiment of the present invention.

Please refer to FIG. 11. FIG. 11 is a partial diagram of a vacuum storage bag assembly 11'' according to a third embodiment of the present invention. As shown in FIG. 11, the vacuum storage bag assembly 11'' of this embodiment includes a zipper bag 111'' and a vacuum valve 112'' and a cap assembly 113''. The structures and the configurations of the zipper bag 111'' and the vacuum valve 112'' of this embodiment can be similar to the ones of the first embodiment or the second embodiment. Detailed description is omitted herein for simplicity. The cap assembly 113'' includes a cap body 1131'' and a sealing member 1132'', such as an O-ring. The cap body 1131'' is configured to cover the connecting port 1121A''. The sealing member 1132'' is disposed on a notch on the connecting port 1121A'' and located between the cap body 1131'' and the connecting port 1121A'' when the cap body 1131'' covers the connecting port 1121A''. In such a way, the cap assembly 113'' can effectively prevent particle or fluid from entering into the vacuum valve 112'', or even the zipper bag 111'', via the connecting port 1121A'' by the cap body 1131'' and the sealing member 1132''. However, the present invention is not limited to this embodiment. For example, in another embodiment, the sealing member 1132'' also can be omitted, and the cap body and the connecting port 1121A'' can be combined by screwing them together.

Figure 12:
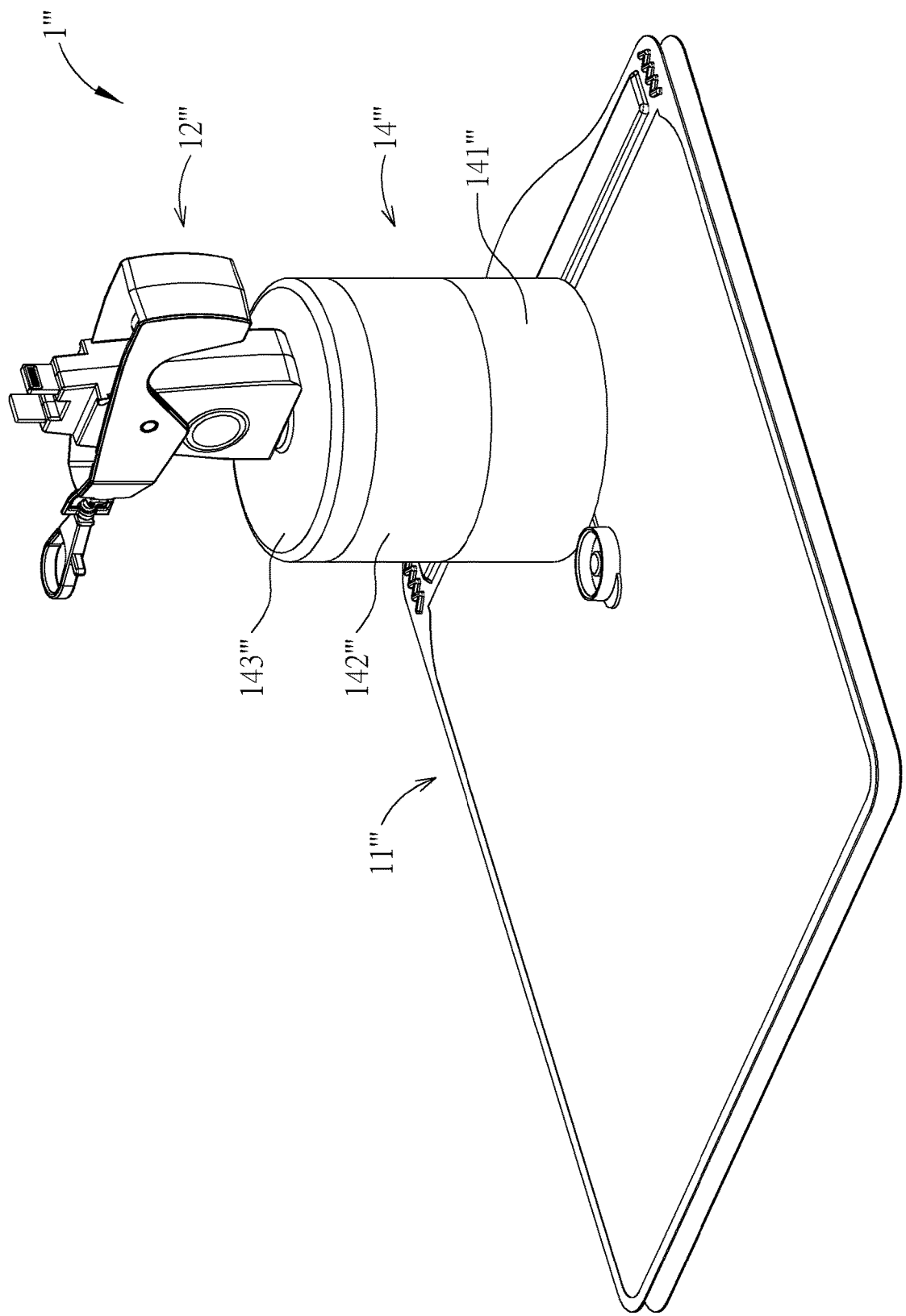
FIG. 12 is a partial diagram of a vacuum storage system according to a fourth embodiment of the present invention.
Figure 13:
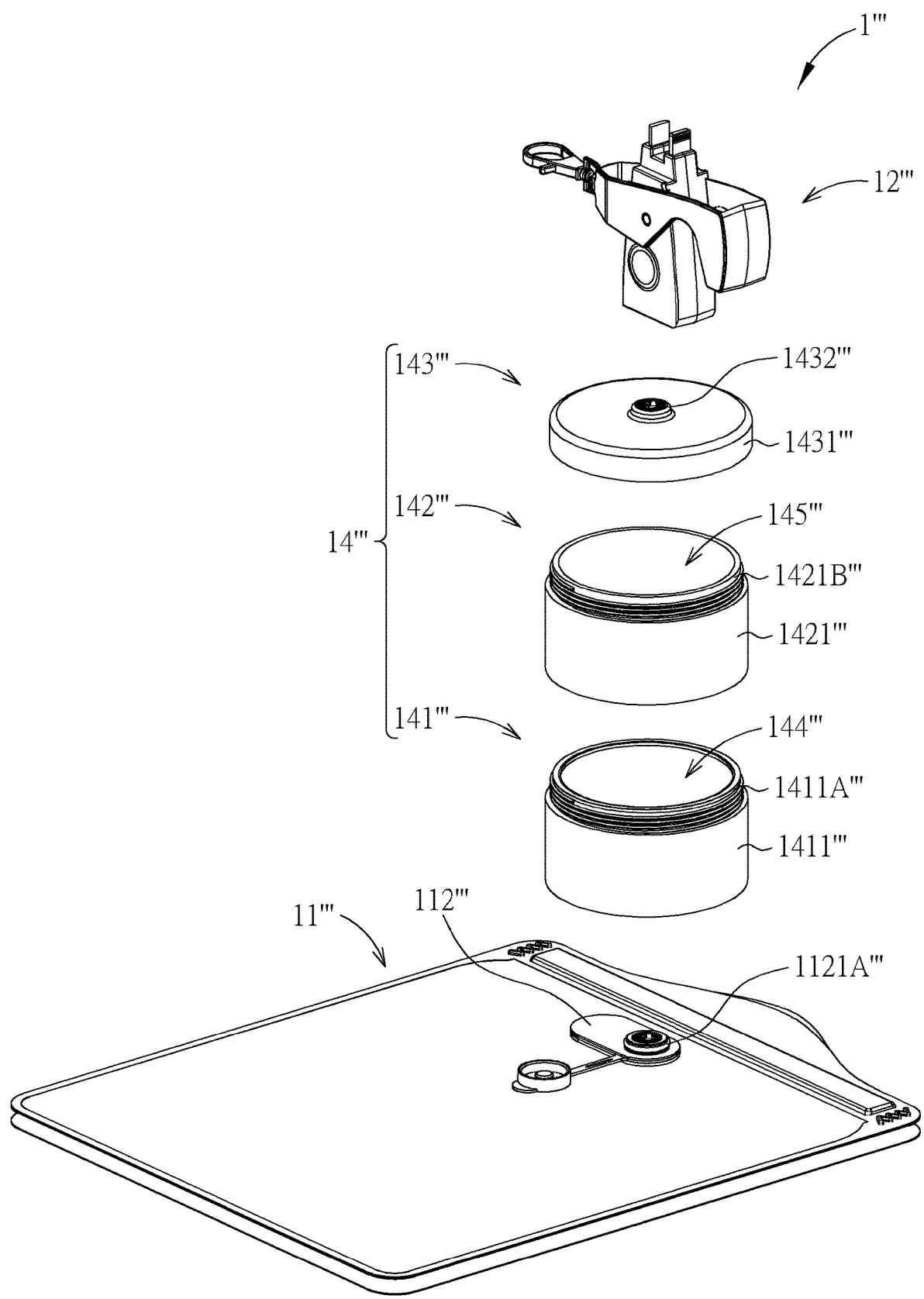
FIG. 13 is a partial exploded diagram of the vacuum storage system according to the fourth embodiment of the present invention.
Figure 14:
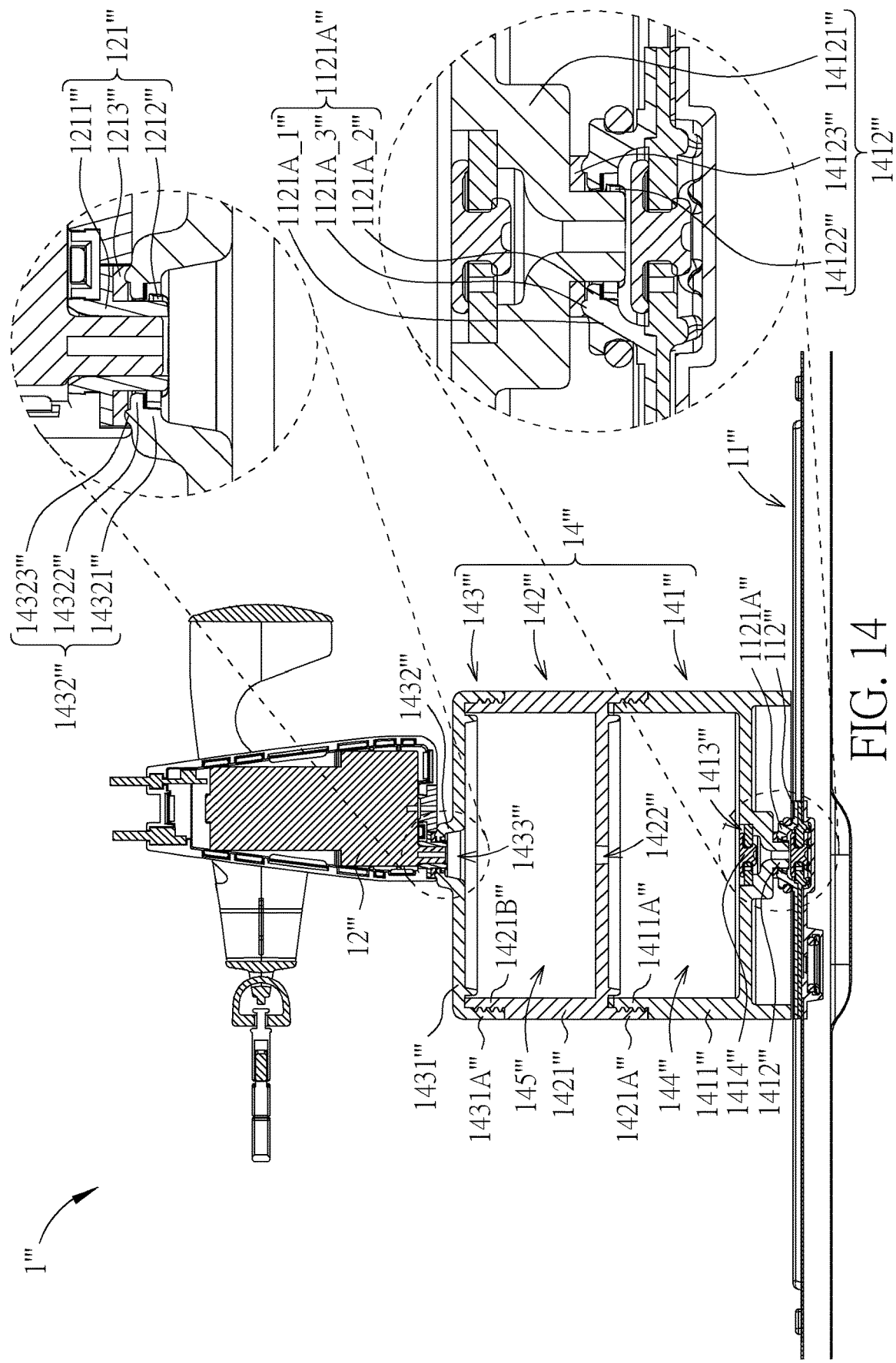
FIG. 14 is a partial sectional diagram of the vacuum storage system according to the fourth embodiment of the present invention.

Please refer to FIG. 12 to FIG. 14. FIG. 12 is a partial diagram of a vacuum storage system 1''' according to a fourth embodiment of the present invention. FIG. 13 is a partial exploded diagram of the vacuum storage system 1''' according to the fourth embodiment of the present invention. FIG. 14 is a partial sectional diagram of the vacuum storage system 1''' according to the fourth embodiment of the present invention. As shown in FIG. 12 to FIG. 14, the vacuum storage system 1''' of this embodiment includes a vacuum storage bag assembly 11''', a portable vacuum source 12''', a portable power supply module, which is not shown in the figures, and an extended receiving cup assembly 14'''. The structure and the configuration of the vacuum storage bag assembly 11''' of this embodiment can be similar to the ones of the third embodiment. The structures and the configurations of the portable vacuum source 12''' and the portable power supply module of this embodiment can be similar to the ones of the first embodiment. Detailed description is omitted herein for simplicity. The extended receiving cup assembly 14''' includes a main receiving cup 141''', an extended receiving cup 142''' and a receiving cup cover 143'''. The main receiving cup 141''' can be connected to a connecting port 1121A''' of a vacuum valve 112''' of the vacuum storage bag assembly 11'''. The receiving cup cover 143''' can be connected to the portable vacuum source 12'''.

The extended receiving cup 142''' can be installed between the receiving cup cover 143''' and the main receiving cup 141'''.

Specifically, in this embodiment, the main receiving cup 141''' includes a main cup body 1411''', a main cup connecting port 1412''', a main cup communication channel 1413''' and a main cup check valve 1414''''. The extended receiving cup 142''' includes an extended cup body 1421''' and an extended communication channel 1422'''. The receiving cup cover 143''' includes a cup cover body 1431''', a cup cover connecting port 1432''' and a cup cover communication channel 1433'''. A first screwing portion 1411A''' is formed the main cup body 1411'''. A second screwing portion 1421A''' and a third screwing portion 1421B''' are formed on the extended cup body 1421'''. A fourth screwing portion 1431A''' is formed on the cup cover body 1431'''. The main cup body 1411''' and the extended cup body 1421''' are detachably combined with each other by cooperation of the first screwing portion 1411A''' and the second screwing portion 1421A'''. The extended cup body 1421''' and the cup cover body 1431''' are detachably combined with each other by cooperation of the third screwing portion 1421B''' and the fourth screwing portion 1431A'''.

A first receiving space 144''' is formed between the main cup body 1411''' and the extended cup body 1431'''. The main cup connecting port 1412''' is disposed on the main cup body 1411''' and configured to connect to the connecting port 1121A''. The main cup communication channel 1413''' is communicated with the first receiving space 144''' and the main cup connecting port 1412'''. The main cup check valve 1414''' is disposed on the main cup communication channel 1413''' and allowing fluid including liquid fluid and gas fluid, to flow from the connecting port 1121A''' of the vacuum valve 112''' through the main cup connecting port 1412''' and the main cup communication channel 1413''' to the first receiving space 144'''. The main cup check valve 1414''' can prevent the liquid fluid from flowing out of the first receiving space 144''' via the main cup communication channel 1413''' when the portable vacuum source 12''' is stopped or when the main receiving cup is detached.

A second receiving space 145''' is formed between the extended cup body 1421''' and the cup cover body 1431'''. The extended cup communication channel 1422''' is communicated with the first receiving space 144''' and the second receiving space 145''' for allowing the fluid to flow from the first receiving space 144''' to the second receiving space 145'''. The cup cover connecting port 1432''' is disposed on the cup cover body 1431''' and configured to connect the portable vacuum source 12'''. The cup cover communication channel 1433''' is communicated with the second receiving space 145''' and the cup cover communication channel 1433'''. When the liquid fluid and the gas fluid are initiated to flow out of interior of a zipper bag 111''' of the vacuum storage bag assembly 11''' during operation of the portable vacuum source 12', the liquid fluid can be received inside the first receiving space 144''' and the second receiving space 145'''.

Furthermore, the cup cover connecting port 1432''' can include a cup cover connecting port body 14321''', four third mating protrusions 14322''' and a cup cover sealing protrusion 14323'''. The structures of the cup cover connecting port body 14321''', the third mating protrusion 14322''' and the cup cover sealing protrusion 14323''' are respectively similar to the structures of a connecting port body 1121A_1''', a first mating port protrusion 1121A_2''' and a sealing protrusion 1121A_3''' of the connecting port 1121A''' of the vacuum valve 112'''. The main cup connecting port 1412''' can include a main cup connecting port body 14121''' four fourth mating protrusions 14122''' and a main cup mating sealing component 14123'''. The structure of the main cup connecting port body 14121''' the fourth mating protrusion 14122''' and the main cup mating sealing component 14123''' are respectively similar to the structure of an interlocking mating port body 1211''', a second mating port protrusion 1212''' and a mating sealing component 1213''' of an interlocking mating port 121''' of the portable vacuum source 12'''. The connection of the cup cover connecting port 1432''' and the interlocking mating port 121''' of the portable vacuum source 12''' can be secured by engagement of the third mating protrusions 14322''' and the first mating port protrusions 1121A_2'''. The connection of the main cup connecting port 1412''' and the connecting port body 1121A_1''' of the vacuum valve 112''' can be secured by engagement of the fourth mating protrusions 14122''' and the second mating port protrusions 1212'''. Detailed description is omitted herein for simplicity.

However, the present invention is not limited to this embodiment. For example, in another embodiment, the extended receiving cup can be omitted, and the receiving cup cover can be connected to the main receiving cup. In other words, in this embodiment, the first receiving space is formed between the cup cover body and the main cup body. Alternatively, in another embodiment, the extended receiving cup assembly can include two or more extended receiving cups connected one by one for providing more receiving space for receiving liquid fluid, and two of the extended receiving cups, the main receiving cup, and the receiving cup cover by an engaging hook and an engaging slot.

In contrast to the prior art, the present invention utilizes the filtrating component disposed on the upstream portion of the communication channel to filter dust, debris, or moisture from the fluid flowing from the interior of the zipper bag. Therefore, the present invention can not only extend storage time and reduce storage volume but also prevent damage of the check valve or the portable vacuum source caused by the aforementioned content. Furthermore, the portable vacuum source can be powered by the mobile phone instead of a fixed power supply, which makes the portable vacuum source safer and more lightweight and portable. Besides, the filtrating component and the check valve can be disposed away from each other horizontally, so as to reduce a thickness of the entire vacuum storage bag assembly. In addition, the filtrating component can be disposed on the lower seat portion disposed on the inner side of the zipper bag, so as to facilitate replacement of the filtrating component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A vacuum storage bag assembly comprising:
   a zipper bag, an opening being formed on the zipper bag; and
   a vacuum valve connected to the zipper bag, the vacuum valve comprising:
   a valve seat disposed on the zipper bag, the valve seat comprising an upper seat portion, a lower seat portion combined with the upper seat portion, a connecting port and a communication channel communicated with the connecting port and with interior of the zipper bag via the opening, and the connecting port being configured to be connected to a vacuum source, the upper seat portion being disposed on an outer side of the zipper bag, and the lower seat portion being disposed on an inner side of the zipper bag;

a filtrating component disposed on an upstream portion of the communication channel, the filtrating component being disposed on the lower seat portion and away from the opening horizontally; and a check valve disposed on a downstream portion of the communication channel and allowing fluid to flow from the interior of the zipper bag, through the filtrating component, and to flow out of the connecting port, the check valve being disposed on the upper seat portion and through the opening.

2. The vacuum storage bag assembly of claim 1, wherein the filtrating component is configured to filter dust, debris, or moisture from the fluid flowing from the interior of the zipper bag.

3. The vacuum storage bag assembly of claim 1, further comprising a cap assembly configured to cover the connecting port.

4. A vacuum storage system comprising:
a vacuum storage bag assembly comprising:
  a zipper bag, an opening being formed on the zipper bag; and
  a vacuum valve connected to the zipper bag, and the vacuum valve comprising:
    a valve seat disposed on the zipper bag, the valve seat comprising an upper seat portion, a lower seat portion combined with the upper seat portion, a connecting port and a communication channel communicated with the connecting port and with interior of the zipper bag via the opening, the upper seat portion being disposed on an outer side of the zipper bag, and the lower seat portion being disposed on an inner side of the zipper bag;
    a filtrating component disposed on an upstream portion of the communication channel, the filtrating component being disposed on the lower seat portion and away from the opening horizontally; and
    a check valve disposed on a downstream portion of the communication channel and allowing fluid to flow from the interior of the zipper bag, through the filtrating component, and to flow out of the connecting port, the check valve being disposed on the upper seat portion and through the opening;
a portable vacuum source configured to connect to the connecting port directly or indirectly and to provide a vacuum suction for the vacuum valve to discharge the fluid through the connecting port; and
a portable power supply module configured to provide electricity to the portable vacuum source.

5. The vacuum storage system of claim 4, wherein the portable power supply module is a mobile phone, and the portable supply module is connected to the portable vacuum source.

6. The vacuum storage system of claim 4, wherein the filtrating component is configured to filter dust, debris, or moisture from the fluid flowing from the interior of the zipper bag.

7. The vacuum storage system of claim 4, wherein the vacuum storage bag assembly further comprises a cap assembly configured to cover the connecting port.

8. The vacuum storage system of claim 4, wherein the portable vacuum source comprises an interlocking mating port configured to be connected to the connecting port, the connecting port comprises a connecting port body and a first mating port protrusion, the interlocking mating port comprises an interlocking mating port body and a second mating port protrusion, when the interlocking mating port body is inserted into the connecting port body along an inserting direction and then rotated relative to the connecting port body by a predetermined degree along a rotating direction perpendicular to the inserting direction, the second mating port protrusion is moved to engage with the first mating port protrusion, so that the interlocking mating port body is prevented from departing away from the connecting port body along a departing direction opposite to the inserting direction, the interlocking mating port body is located at the connecting position relative to the connecting port body when the second mating port protrusion is moved to engage with the first mating port protrusion.

9. The vacuum storage system of claim 8, wherein the interlocking mating port further comprises a mating sealing component disposed on a side of the interlocking mating port body adjacent to the connecting port body, the connecting port further comprises a sealing protrusion protruding from a side of the connecting port body toward the mating sealing component, the mating sealing component is compressed by the sealing protrusion when the interlocking mating port body is located at the connecting position relative to the connecting port body.

10. The vacuum storage system of claim 4, further comprising an extended receiving cup assembly, the extending receiving cup assembly comprising a main receiving cup, at least one extended receiving cup and a receiving cup cover, the main receiving cup being configured to connect to the connecting port, the receiving cup cover being configured to connect to the portable vacuum source, the at least one extended receiving cup being configured to be detachable installed between the main receiving cup and the receiving cup cover.

11. A vacuum storage bag assembly comprising:
a zipper bag, an opening and a recess being formed on the zipper bag; and
a vacuum valve connected to the zipper bag, the vacuum valve comprising:
  a valve seat disposed on an outer side of the zipper bag, the valve seat comprising a connecting port and a communication channel communicated with the connecting port and with interior of the zipper bag via the opening, and the connecting port being configured to be connected to a vacuum source;
  a filtrating component disposed on an upstream portion of the communication channel, the filtrating component being disposed and abutted between the valve seat and the zipper bag, the opening being covered by the filtrating component; and
  a check valve disposed on the valve seat and on a downstream portion of the communication channel and allowing fluid to flow from the interior of the zipper bag, through the filtrating component, and to flow out of the connecting port, the check valve being at least partially accommodated in the recess and away from the opening horizontally.

12. The vacuum storage bag assembly of claim 11, wherein the filtrating component is configured to filter dust, debris, or moisture from the fluid flowing from the interior of the zipper bag.

13. The vacuum storage bag assembly of claim 11, further comprising a cap assembly configured to cover the connecting port.

14. A vacuum storage system comprising:
a vacuum storage bag assembly comprising:
- a zipper bag, an opening and a recess being formed on the zipper bag; and
- a vacuum valve connected to the zipper bag, and the vacuum valve comprising:
  - a valve seat disposed on an outer side of the zipper bag, the valve seat comprising a connecting port and a communication channel communicated with the connecting port and with interior of the zipper bag via the opening;
  - a filtrating component disposed on an upstream portion of the communication channel, the filtrating component being disposed and abutted between the valve seat and the zipper bag, the opening being covered by the filtrating component; and
  - a check valve disposed on the valve seat and on a downstream portion of the communication channel and allowing fluid to flow from the interior of the zipper bag, through the filtrating component, and to flow out of the connecting port, the check valve being at least partially accommodated in the recess and away from the opening horizontally;
- a portable vacuum source configured to connect to the connecting port directly or indirectly and to provide a vacuum suction for the vacuum valve to discharge the fluid through the connecting port; and
- a portable power supply module configured to provide electricity to the portable vacuum source.

15. The vacuum storage system of claim 14, wherein the portable power supply module is a mobile phone, and the portable supply module is connected to the portable vacuum source.

16. The vacuum storage system of claim 14, wherein the filtrating component is configured to filter dust, debris, or moisture from the fluid flowing from the interior of the zipper bag.

17. The vacuum storage system of claim 14, wherein the vacuum storage bag assembly further comprises a cap assembly configured to cover the connecting port.

18. The vacuum storage system of claim 14, wherein the portable vacuum source comprises an interlocking mating port configured to be connected to the connecting port, the connecting port comprises a connecting port body and a first mating port protrusion, the interlocking mating port comprises an interlocking mating port body and a second mating port protrusion, when the interlocking mating port body is inserted into the connecting port body along an inserting direction and then rotated relative to the connecting port body by a predetermined degree along a rotating direction perpendicular to the inserting direction, the second mating port protrusion is moved to engage with the first mating port protrusion, so that the interlocking mating port body is prevented from departing away from the connecting port body along a departing direction opposite to the inserting direction, the interlocking mating port body is located at the connecting position relative to the connecting port body when the second mating port protrusion is moved to engage with the first mating port protrusion.

19. The vacuum storage system of claim 18, wherein the interlocking mating port further comprises a mating sealing component disposed on a side of the interlocking mating port body adjacent to the connecting port body, the connecting port further comprises a sealing protrusion protruding from a side of the connecting port body toward the mating sealing component, the mating sealing component is compressed by the sealing protrusion when the interlocking mating port body is located at the connecting position relative to the connecting port body.

20. The vacuum storage system of claim 14, further comprising an extended receiving cup assembly, the extending receiving cup assembly comprising a main receiving cup, at least one extended receiving cup and a receiving cup cover, the main receiving cup being configured to connect to the connecting port, the receiving cup cover being configured to connect to the portable vacuum source, the at least one extended receiving cup being configured to be detachable installed between the main receiving cup and the receiving cup cover.

* * * * *